United States Patent
Wang et al.

(10) Patent No.: US 12,091,611 B2
(45) Date of Patent: Sep. 17, 2024

(54) ENHANCED OIL RECOVERY WITH JANUS NANOPARTICLES

(71) Applicant: Saudi Arabian Oil Company, Dhahran (SA)

(72) Inventors: Wei Wang, Quincy, MA (US); Sehoon Chang, Boston, MA (US); Amr I. Abdel-Fattah, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 18/487,571

(22) Filed: Oct. 16, 2023

(65) Prior Publication Data

US 2024/0034925 A1 Feb. 1, 2024

Related U.S. Application Data

(62) Division of application No. 17/381,344, filed on Jul. 21, 2021, now Pat. No. 11,827,850.

(60) Provisional application No. 63/056,238, filed on Jul. 24, 2020.

(51) Int. Cl.
| | |
|---|---|
| *E21B 43/26* | (2006.01) |
| *C09K 8/60* | (2006.01) |
| *C09K 8/70* | (2006.01) |
| *C09K 8/84* | (2006.01) |
| *B82Y 30/00* | (2011.01) |

(52) U.S. Cl.
CPC ............. *C09K 8/70* (2013.01); *C09K 8/604* (2013.01); *C09K 8/845* (2013.01); *B82Y 30/00* (2013.01); *C09K 2208/06* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 6,166,095 A | * | 12/2000 | Bryan ..................... C09K 8/22 507/140 |
| 6,638,885 B1 | | 10/2003 | McGrath et al. |
| 7,875,654 B2 | | 1/2011 | Hong et al. |
| 8,722,812 B2 | | 5/2014 | Yabu et al. |
| 9,708,525 B2 | | 7/2017 | Suresh et al. |

(Continued)

FOREIGN PATENT DOCUMENTS

| | | |
|---|---|---|
| CN | 111303853 | 6/2020 |
| KR | 102151481 | 9/2020 |

(Continued)

OTHER PUBLICATIONS

Chen et al., "Synthesis of ordered lamellar supermicroporous silica with rigid neutral and long-chain cationic composite templating route," Plos One, Apr. 26, 2019, 14(4):3-5, 13 pages.

(Continued)

*Primary Examiner* — Charles R Nold
(74) *Attorney, Agent, or Firm* — Fish & Richardson P.C.

(57) ABSTRACT

Enhanced oil recovery (EOR) including with a lamellar phase having Janus nanoparticles, petroleum surfactant, crude oil, and water and with additional water to give the flooding fluid that may be pumped through a wellbore into a subterranean formation to affect a property of hydrocarbon in the subterranean formation via contact of the flooding fluid with the hydrocarbon.

11 Claims, 10 Drawing Sheets

(56) References Cited

U.S. PATENT DOCUMENTS

| | | | |
|---|---|---|---|
| 9,873,827 | B2 | 1/2018 | Chakraborty et al. |
| 10,316,873 | B2 | 6/2019 | Weitz et al. |
| 10,392,555 | B2 | 8/2019 | Giro et al. |
| 10,934,475 | B2 | 3/2021 | Ren et al. |
| 11,472,709 | B2 | 10/2022 | Wang et al. |
| 11,572,282 | B2 | 2/2023 | Wang |
| 2008/0206317 | A1 | 8/2008 | Johnsson et al. |
| 2010/0305219 | A1 | 12/2010 | Granick et al. |
| 2010/0314118 | A1* | 12/2010 | Quintero .................. C09K 8/68 166/305.1 |
| 2015/0175876 | A1 | 6/2015 | Resasco et al. |
| 2015/0218435 | A1 | 8/2015 | Suresh et al. |
| 2015/0218921 | A1* | 8/2015 | Suresh .................... E21B 43/20 166/305.1 |
| 2015/0299369 | A1 | 10/2015 | Ausserre et al. |
| 2017/0173546 | A1 | 6/2017 | Cheng et al. |
| 2019/0016943 | A1 | 1/2019 | Ren et al. |
| 2019/0374916 | A1 | 12/2019 | Sherman et al. |
| 2020/0290879 | A1 | 9/2020 | Chang et al. |
| 2021/0107798 | A1 | 4/2021 | Wang |
| 2023/0002234 | A1 | 1/2023 | Wang et al. |

FOREIGN PATENT DOCUMENTS

| | | |
|---|---|---|
| WO | WO 2017015120 | 1/2017 |
| WO | WO 2017210424 | 12/2017 |
| WO | WO 2019027817 | 2/2019 |

OTHER PUBLICATIONS

Constantin and Davidson, "Lamellar Lα mesophases doped with inorganic nanoparticles," MINIREVIEW, Chem. Phys. Chem., Feb. 24, 2014, 15: 1270-1282, 12 pages.

Esmaeilzadeh et al., "Effect of ZrO2 nanoparticles on the interfacial behavior of surfactant solutions at air-water and n-heptane-water interfaces," Fluid Phase Equilibria, 2014, 361:289-295, 7 pages.

He et al., "One-pot Facile Synthesis of Janus Particles with Tailored Shape and Functionality," Electronic Supplementary Material (ESI) for Chemical Communications, The Royal Society of Chemistry, 2011, 17 pages.

Holm et al., "Synthesis, Characterization, and Light-Induced Spatial Charge Separation in Janus Graphene Oxide," Chem. Mater. 2018, 30:2084-2092, 9 pages.

Hu et al., "Fabrication, properties and applications of Janus particles," Chemical Society Reviews, 2012, 41:4356-4378, 23 pages.

Liang et al., "Janus hollow spheres by emulsion interfacial self-assembled sol-gel process," Chemical Communications, Jan. 2011, 47(4):1231-1233, 3 pages.

Luo et al., "Nanofluid of graphene-based amphiphilic Janus nanosheets for tertiary or enhanced oil recovery: High performance at low concentration," Proceedings of the National Academy of Sciences of USA (PNAS), Jul. 12, 2016, 113(28):7711-7716, 6 pages.

Luo et al., "Secondary Oil Recovery Using Graphene-Based Amphiphilic Janus Nanosheet Fluid at an Ultralow Concentration," Industrial & Engineering Chemistry Research, Sep. 2017, 56:11125-11132, 25 pages.

McGrail et al., "Selective mono-facial modification of graphene oxide nanosheets in suspension," Chemical Communications, 2016, 52:288-291, 5 pages.

Meyre et al, "Radiation-Induced Synthesis of Gold Nanoparticles within Lamellar Phases. Formation of Aligned Colloidal Gold by Radiolysis," Langmuir, 2008, 24(9): 4421-4425, 5 pages.

Negin et al., "Application of nanotechnology for enhancing oil recovery—A review," Petroleum, 2016, 2(4):324-333, 21 pages.

Negin et al., "Most common surfactants employed in chemical enhanced oil recovery," Petroleum, 2017, 3:197-211, 32 pages.

Ng et al., "Graphene-based two-dimensional Janus materials," NPG Asia Materials, Apr. 2018, 10(4): 1-21, 21 pages.

PCT International Search Report and Written Opinion in International Appln. No. PCT/US2021/042972, dated Nov. 12, 2021, 15 pages.

Peng et al., "A review of nanomaterials for nanofluid enhanced oil recovery," RSC Advanced, 2017, 7:32246-32254, 9 pages.

Perro et al., "Production of large quantities of "Janus" nanoparticles using wax-in-water emulsions," Colloids and Surfaces A: Physicochem. Eng. Aspects 332, 2009, 57-62, 6 pages.

Sharma and Mohanty, "Wettability Alteration in High-temperature and High-salinity Carbonate Reservoirs," SPE 147306, Society of Petroleum Engineers (SPE), presented at the SPE Annual Technical Conference and Exhibition, Oct. 30-Nov. 2, 2011, SPE Journal 18(4):646-655, Aug. 2013, 10 pages.

Vatanparast et al., "Wettability alteration of low-permeable carbonate reservoir rocks in presence of mixed ionic surfactants," Petroleum Science and Technology, 2011, 29(18): 1873-1884, 14 pages.

Walther et al, "Janus Particles: Synthesis, Self-Assembly, Physical Properties and Applications," American Chemical Society (ACS Publications), Chem. Rev., Apr. 2013, 113(7):5194-5261, 68 pages.

Wang et al., "Stepwise interfacial self-assembly of nanoparticles via specific DNA pairing," Phys. Chem. Chem. Phys., 2007, 9:6313-6318, 8 pages.

Zhang et al., "Janus Particles: Synthesis, Self-Assembly, Physical Properties, and Applications," Chemical Review, 2013, 113:5194-5261, 14 pages.

Zhang et al., "Novel zwitterionic surfactant derived from castor oil and its performance evaluation for oil recovery," Colloids Surfaces A: Physicochemical and Engineering Aspects, 2015, 483:87-95, 42 pages.

* cited by examiner

500

CHAPS

CHAPSO 3-(4-tert-butyl-1-pyridinio)-1-propanesulfonate 3-(1-pyridinio)-1-propanesulfonate

ENHANCED OIL RECOVERY WITH JANUS NANOPARTICLES

CROSS REFERENCE TO RELATED PATENT APPLICATIONS

This application is a divisional of and claims the benefit of priority to U.S. patent application Ser. No. 17/381,344, filed Jul. 21, 2021, which claims the benefit of U.S. Provisional Application No. 63/056,238, filed Jul. 24, 2020, the contents of which are incorporated by reference herein.

TECHNICAL FIELD

This disclosure relates to enhanced oil recovery (EOR) involving flooding.

BACKGROUND

Oil production may be separated into at least the three phases of primary, secondary, and tertiary. Primary recovery may be, for example, via pressure depletion. Primary oil recovery is generally limited to hydrocarbons that naturally rise to the surface or recovered via artificial lift devices such as pumps. Secondary recovery employs water injection and gas injection to displace oil to the surface. Primary recovery and secondary recovery in combination generally recover about 20% to 50% of original oil in place (OOIP). Therefore, a large amount of oil (for example, at least 50% of the crude oil in the reservoir) typically remains in the reservoir or subterranean formation after application of these conventional oil-recovery processes of primary recovery and secondary recovery. Primary and secondary recovery of production can leave up to 75% of the crude oil in the well.

A way to further increase oil production is through tertiary recovery also known as enhanced oil recovery (EOR). Tertiary oil recovery or EOR increases the amount of crude oil or natural gas that can be extracted from a reservoir or subterranean formation. Although typically more expensive to employ on a field than conventional recovery, EOR can increase production from a well up to 75% recovery or more. For example, the additional employment of EOR may result in the cumulative extraction of 30% to 60+% of reservoir oil compared to 20% to 40% recovery of reservoir oil employing only primary and secondary recovery. EOR or tertiary recovery can extract crude oil from an oil field that cannot be extracted otherwise. There are different EOR or tertiary techniques.

SUMMARY

An aspect relates to a method of enhanced oil recovery (EOR), including combining a lamellar phase having Janus nanoparticles, a petroleum surfactant, crude oil, and water with additional water to give a flooding fluid, and pumping, via a centrifugal pump, the flooding fluid through a wellbore into a subterranean formation to affect a property of hydrocarbon in the subterranean formation via contact of the flooding fluid with the hydrocarbon.

Another aspect relates to a method of synthesizing Janus nanoparticles for EOR, including forming in a vessel a lamellar phase comprising water layers, crude oil layers, and a zwitterionic petroleum surfactant, reacting chemical reagents in the lamellar phase in the vessel to form Janus nanoparticles at interfaces of the water layers with the crude oil layers, and collecting the lamellar phase from the vessel for distribution to an EOR application involving nanofluid flooding via the Janus nanoparticles and surfactant flooding via the zwitterionic petroleum surfactant.

Yet another aspect relates to a method of EOR, including forming in a reactor vessel a lamellar phase having water layers, crude oil layers, and a petroleum surfactant, and reacting chemical reagents in the lamellar phase in the reactor vessel to form Janus nanoparticles at interfaces of the water layers with the crude oil layers. The method includes mixing water with the lamellar phase to give a flooding fluid that is at least nanofluid. The method includes providing the flooding fluid via a pump through a wellbore into a subterranean formation, and flooding the subterranean formation as EOR, wherein the flooding involves nanofluid flooding via the Janus nanopatricles.

Yet another aspect relates to a flooding fluid for EOR. The flooding fluid includes a lamellar phase collected from a reactor vessel. The lamellar phase includes a petroleum surfactant, crude oil, water, and Janus nanoparticles. The flooding includes an aqueous fluid that is water, brine, or seawater, or any combinations thereof, wherein the flooding fluid is a nanofluid based on the Janus nanoparticles, and wherein the flooding fluid to affect a property of hydrocarbon in a subterranean formation via contact of the flooding fluid with the hydrocarbon.

The details of one or more implementations are set forth in the accompanying drawings and the description below. Other features and advantages will be apparent from the description and drawings, and from the claims.

DETAILED DESCRIPTION

Figure 1:
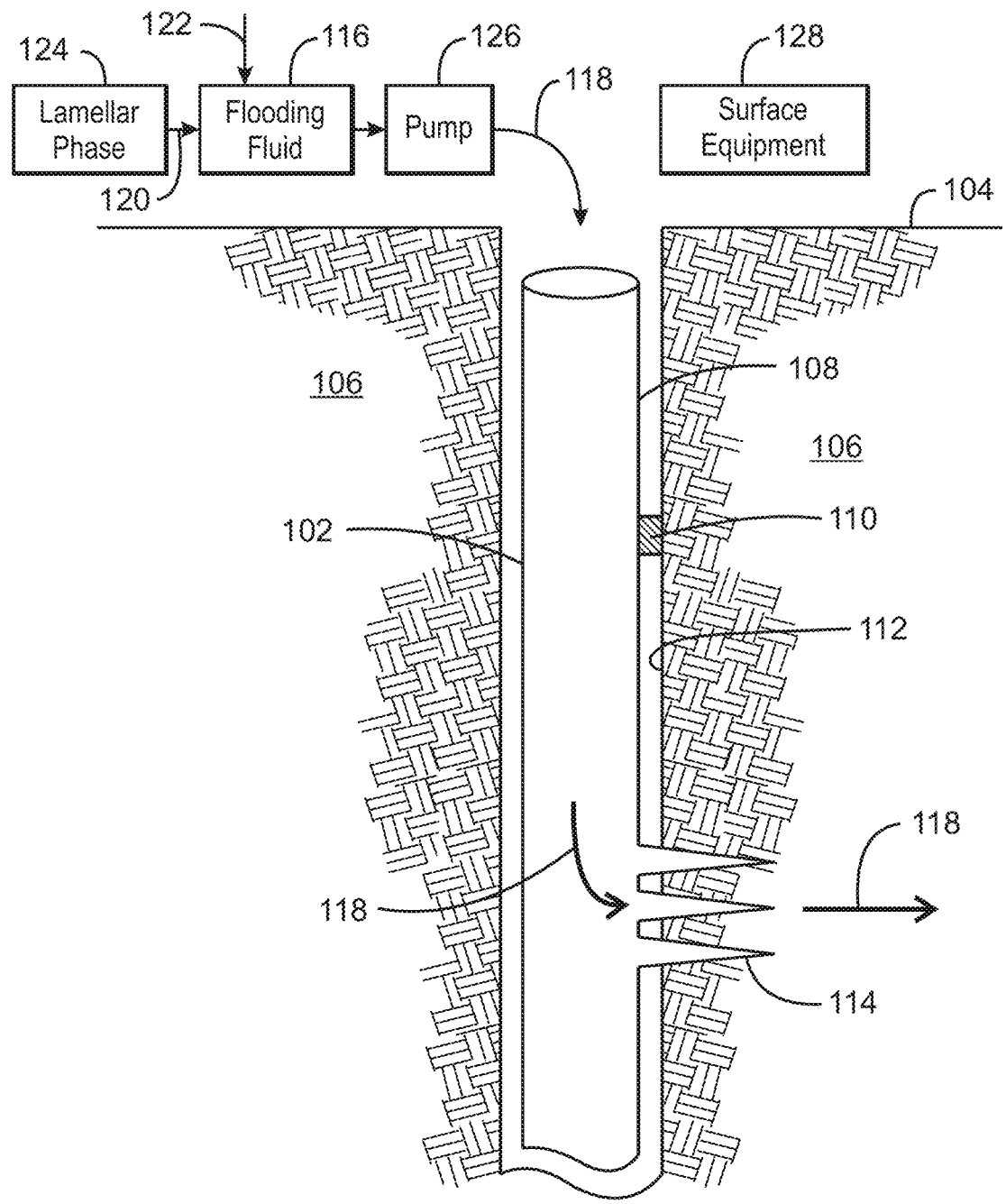
FIG. 1 is a diagram of a well site having a wellbore.

Some aspects of the present disclosure are directed to a lamellar phase having Janus nanoparticles and petroleum surfactant for flooding in enhanced oil recovery (EOR). The petroleum surfactant may be utilized in the initial formation of the lamellar phase and also as an EOR agent in the subsequent EOR. The Janus nanoparticles formed in the lamellar phase may also be an EOR agent in the subsequent EOR. The Janus nanoparticles may be, for example, Janus metal-oxide nanoparticles or Janus graphene-oxide (GO) nanosheets.

The lamellar phase may be utilized to form the Janus nanoparticles. The lamellar phase having the Janus nanoparticles (as formed therein) and the petroleum surfactant may be subsequently employed in flooding a subterranean formation in EOR. As mentioned, both the Janus nanoparticles and the petroleum surfactant may each be an EOR agent. The Janus nanoparticles may give the flooding fluid as a nanofluid for nanofluid flooding. The presence of the petroleum surfactant may provide for surfactant flooding with the nanofluid. In implementations, EOR efficiency may be increased by the combination of (1) surfactant flooding via the petroleum surfactant in the nanofluid and (2) nanofluid flooding via the Janus nanoparticles in the nanofluid. In some implementations, the Janus nanoparticles and the petroleum surfactant perform synergistically in the EOR. In other words, the combined contribution (to hydrocarbon recovery) is greater than the sum of the individual contributions of the Janus nanomaterial and petroleum surfactant if employed without the other.

Nanofluid flooding is an emerging EOR technique whereby injection fluids containing nanoparticles are utilized for the oil displacement and/or injectivity improvement in oil reservoirs. A nanofluid is a fluid having nanoparticles. The injection of nanofluids into oil reservoirs has the potential to produce a portion of the in-place oil reserves not recoverable by conventional primary and secondary recovery techniques, nor recoverable by certain EOR such as polymer or surfactant flooding in instances. If nanoparticles employed in the nanofluid are nanoparticles (e.g., nanostructures, nanosheets, nanoplatelets, nanocomposites, generally spherical particles, etc.) that have been modified with hydrophobic and hydrophilic groups on opposite sides respectively, forming Janus nanoparticles with asymmetric surface properties, then the nanoparticles will generally have tendency to adsorb onto oil-water interfaces and reduce interfacial tension (IFT) sharply. The surface activity of a Janus nanoparticle is typically dependent on its surface modifications. The Janus nanoparticles have beneficial properties but have been difficult to be produced conventionally in large quantities economically, and thus industrial application has been limited. Literature reported methods for production of Janus nanoparticles have typically been at lab research scale, and in which expensive organic solvent and multiple-step reactions are utilized in the syntheses. Conversely, some present embodiments herein provide for syntheses of Janus nanoparticles (e.g., Janus metal-oxide nanoparticles, Janus GO nanosheets, etc.) at larger scale and with crude oil as the organic solvent, and therefore promote application of the Janus nanoparticles in the oil-and-gas industry and other industries. The techniques may advance economical mass production of Janus nanomaterials.

The term "crude oil" may refer to unrefined petroleum or liquid petroleum. Crude oil may be a complex mixture of naturally occurring hydrocarbon compounds found in rock. Crude oil may include impurities, such as sulfur, oxygen, and nitrogen. The color, gravity, odor, sulfur content, and viscosity may vary among types of crude oil. The crude oil can be light or medium-light types of crude oils with relatively low viscosity. In some instances, heavy oil as the crude oil may be avoided. The crude oil may be be degassed to remove $H_2S$. The term "nanoparticles" may refer to particles that have a mean cross-section, for example, a mean diameter, of less than 1000 nanometers (nm), less than 300 nm, less than 100 nm, or less than 10 nm. In some embodiments, the mean cross-section is measured by dynamic light scattering. The term "nanoparticles" may be inclusive of "nanosheets." The term "nanosheet" refers to a two-dimensional nanostructure. The thickness of a nanosheet is in a range of 1 nm to 100 nm.

FIG. 1 is a well site 100 having a wellbore 102 formed through the Earth surface 104 into a subterranean formation 106 in the Earth crust. The well site 100 is utilized for flooding of the subterranean formation 106 as tertiary recovery or EOR. The well may be an injection well. The well may be a producing well in which production is suspended or ended. An injection well may be a well in which fluids are injected rather than produced. Injection wells generally may provide for the fluid injection to maintain reservoir pressure or for flooding, chemical injection, or fluid disposal.

In the illustrated implementation, the wellbore 102 includes casing 108. Cement 110 is disposed in the annulus between the casing 108 and the surface 112 of the subterranean formation 206. Perforations 114 are formed through the casing 108 wall and cement 110 into the subterranean formation 106. In the illustrated embodiment, a vessel 116 is disposed at the Earth surface 104 adjacent the wellbore 102. The vessel 116 may be, for example, a stand-alone vessel or a container on a vehicle. The vessel 116 holds a flooding fluid 118.

The flooding fluid 118 is a mixture of a lamellar phase 120 dispersed in water 122 for flooding of the geological formation 106. The flooding fluid 118 may also include, for example, salt and other components. The lamellar phase 120 is provided to the vessel 116. In the illustrated embodiment, the water 122 (e.g., as the majority fluid or base fluid) is added to the vessel 116. The water 122 may include additional components. In some implementations, the water 122 added is seawater or brine and therefore the flooding fluid 118 may have seawater or brine as a base fluid. The lamellar phase 120 (e.g., having Janus nanoparticles, petroleum surfactant, crude oil, and water) is mixed with the added water 122 in the vessel 116 to give the flooding fluid 118. In some embodiments, the lamellar phase 120 and water 122 may be mixed prior to addition to the vessel 116 and the mixture added to the vessel 116. The lamellar phase 120 or components of the lamellar phase 120 may be at a specified concentration in the flooding fluid 118. In implementations, the flooding fluid 118 may be labeled as nanofluid because of the presence of the Janus nanoparticles. The concentration of the Janus nanoparticles in the flooding fluid 118 may be less than 1 weight percent (wt %) or less than 0.2 wt %. The concentration of the petroleum surfactant in the flooding fluid 118 may be less than 1 wt % or less than 0.2 wt %. For the EOR application, the surfactant and Janus nanoparticles are at very low concentrations, typically less than 1 wt %, or less than 0.1 wt %. At such a low concentration, the lamellar phase no longer exists as a lamellar phase. For cost consideration, seawater may be employed as the brine.

In the illustrated embodiment, the lamellar phase 120 may be provided from a reactor vessel 124. The reactor vessel 124 may be disposed remotely and the lamellar phase 120 transported (e.g., via a vehicle) to the well site 100 for addition to the vessel 116. On the other hand, the reactor vessel 124 may be disposed at the well site 100. If disposed at the well site 100, the reactor vessel 124 in some implementations may be operationally coupled to the vessel 116 to provide the lamellar phase 120 through a conduit to the vessel 116. The motive force for flow of the lamellar phase 120 from the reactor vessel 124 to the vessel 116 may be by vessel operating-pressure differential or by a pump (not shown) disposed along the conduit.

Figure 2:
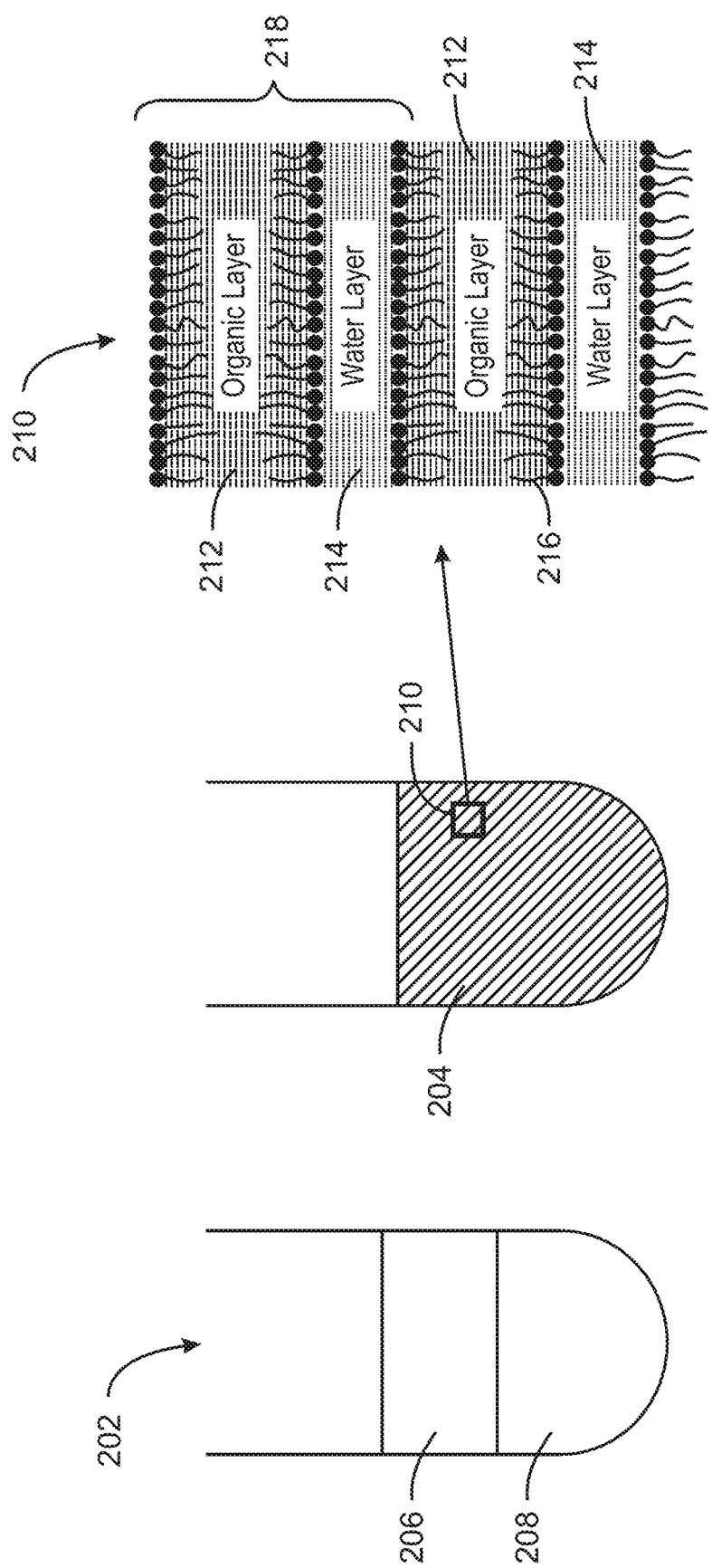
FIG. 2 is a diagram of a lamellar phase.
Figure 3:
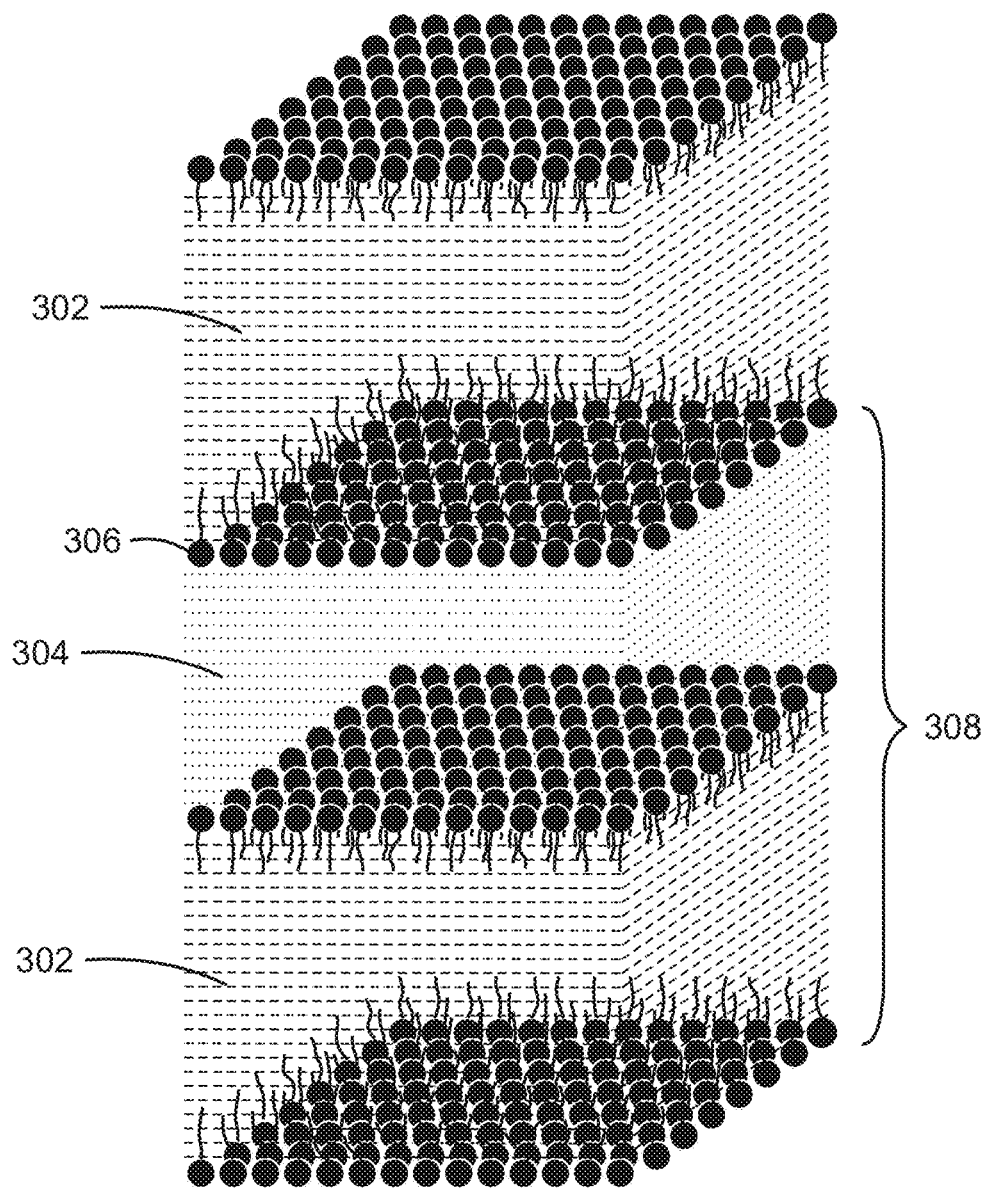
FIG. 3 is a diagram of a lamellar phase.

The reactor vessel 124 may receive water, surfactant (e.g., petroleum surfactant), and organic solvent (e.g., crude oil) to initially form the lamellar phase (e.g., FIG. 2 and FIG. 3). The reactor vessel 124 may receive chemical precursors (chemical reagents) to form Janus nanoparticles in the lamellar phase to give the lamellar phase 120 provided to the vessel 116. The lamellar phase 120 provided to the vessel 116 includes the Janus nanoparticles formed along with the surfactant, organic solvent, and water that built the initial lamellar phase. In some embodiments, the vessel 116 may also act as the reactor vessel 124.

In implementations, the Janus nanoparticles may be Janus metal-oxide nanoparticles formed by adding hydrophilic chemical precursors and hydrophobic chemical precursors to the reactor vessel 124. See, e.g., FIG. 4. The hydrophobic chemical precursors (chemical reagents) and the hydrophobic chemical precursors (chemical reagents) meet at the interfaces between organic layers (oil layers) and water layers and react to form the Janus metal-oxide nanoparticles at the interfaces. In other implementations, the Janus nanoparticles may be Janus graphene oxide (GO) nanosheets formed by adding GO nanosheets (hydrophilic) and a chemical precursor(s) that is a hydrophobic functional agent to the reactor vessel 124. The hydrophilic GO nanosheets and the hydrophobic functional agent (chemical reagent) meet at the interfaces between organic layers and water layers and react to form the Janus GO nanosheets at the interfaces. In particular, the hydrophobic functional agent grafts onto the surface of the GO nanosheets from the organic layer side via the surface —OH groups of the GO nanosheets turning that side of the GO nanosheet from hydrophilic to hydrophobic. The side of the GO nanosheet facing the water layer remains hydrophilic.

In operation for the flooding, the flooding fluid 118 is provided via a motive device, such as a pump 126, to inside the casing 108 of the wellbore 102. Controls, such as flow controls, may be associated with the provision of the flooding fluid 118. For example, a control system may adjust the speed of the pump 126 to maintain or modulate flow rate of the flooding fluid 118. In another example, a control valve (for example, on a discharge conduit of the pump 126) may maintain or modulate the flow rate of the flooding fluid 118. In some implementations, the set point for flow rate may input by a user via the control system, or the set point may be input or altered by control logic.

The flooding fluid 118 is pumped or flows through the perforations 114 into the subterranean formation 106 for the flooding. This injection of the flooding fluid 118 may provide for sweep of the flooding fluid 118 through the subterranean formation 106 to displace crude oil (and natural gas) to a producing well. This displacement may increase production of the producing well or increase recovery of crude oil from the subterranean formation 106. The oil may be in a hydrocarbon reservoir in the subterranean formation 106. In certain implementations, after injection of the flooding fluid 118, water or fluid may be pumped or injected through the perforations 114 into the subterranean formation 106 as a drive fluid.

The flooding may be nanofluid flooding because of the presence of the Janus nanoparticles in the flooding fluid 118. The Janus nanoparticles may interact with oil-water interfaces in the subterranean formation 106 to reduce interfacial tension (IFT). The Janus nanoparticles may also reduce viscosity of the flooding fluid and therefore improve (increase) well injectivity. The nanofluid flooding may also incorporate surfactant flooding with the presence of the surfactant incorporated from the lamellar phase 120. The surfactant may be a petroleum surfactant such as petroleum sulfonate surfactant. The petroleum surfactant may zwitterionic or other types. See FIG. 5 for examples of applicable surfactants. Furthermore, the organic solvent (e.g., crude oil) from the lamellar phase 120 may promote the EOR flooding.

Lastly, the well site 100 may have surface equipment 128 that supports the EOR or flooding operation. The surface equipment 128 may also include a rig to drill boreholes and equipment to place and cement the casing 108. A power supply, control system (or computing system), and mobile laboratory may be at the Earth surface 104. Janus nanomaterial in nanoscale (or submicron scale) may be unique among nanoscale materials generally because Janus nanomaterial (nanoparticles) provide asymmetry. The Janus nanostructures are asymmetric. The Janus nanostructures (nanoparticles) via their asymmetry can impart different chemical or physical properties and directionality within a single nanostructure. In some implementations, Janus nanostructures may be formed by apportioning a nanoparticle into two distinct parts, each part of a different respective material or bearing different functional groups. For example, a Janus nanoparticle may have one-half of its surface composed of hydrophilic groups and the other half hydrophobic groups. This may impart properties related to the asymmetric structure or functionalization of the Janus nanoparticle. The synthesis of Janus nanoparticles may rely on selectively forming each side of a nanometer-sized particle with different chemical properties.

Janus nanomaterial has generally not been manufactured in industrial-scale quantities. Janus nanoparticles have been synthesized at the laboratory research scale. Embodiments of the present techniques synthesize Janus nanoparticles at larger than research scale. Embodiments herein may generate Janus nanoparticles at greater than one kilogram (kg) in a day. Therefore, Janus nanoparticles may be produced at commercial scale for supply in applications across several industries. One example of an application is in the oil industry in which Janus nanoparticles, such as Janus metal-oxide nanoparticles or Janus GO nanosheets, are utilized is nanofluid flooding in EOR. Aspects of the present techniques may provide for mass production of Janus nanoparticles for industrial application.

The synthesis or a portion of the synthesis of the Janus nanoparticles may be a one-pot synthesis (e.g., in the reactor vessel 124 of FIG. 1). In chemistry, a one-pot synthesis may be that chemical reactions occur in one reactor vessel. This may be desirable in avoiding separation and purification of intermediate chemical compounds and thus save time and resources. A one-pot synthesis or one-pot mass synthesis of the Janus nanoparticles may be implemented via the lamellar phase.

Nanofluid flooding to increase oil recovery may utilize Janus nanoparticles as EOR agents. To form the Janus nanoparticles prior to the nanofluid flooding, a lamellar phase may be employed. For instance, lamellar phases can be built with petroleum surfactants, crude oils, and water, and utilized as reaction templates for mass synthesis of Janus nanoparticles for industrial applications including EOR nanofluid flooding. The petroleum surfactant can be a zwitterionic surfactant (or other surfactant types) to build the liquid-crystal lamellar phase under certain conditions.

As discussed, Janus nanoparticles are types of nanoparticles with at least two surfaces having different respective physical properties. This surface arrangement of Janus nanoparticles allows two different types of chemistry to occur on the same particle. This surface configuration gives properties related to the asymmetric structure or asymmetric functionalization of the particles. The synthesis of Janus nanoparticles generally relies on selectively creating each side of a nanometer-sized particle with different chemical properties. Example syntheses of Janus nanoparticles have included masking, self-assembly, and phase separation. As indicated, Janus nanoparticles have generally been produced in the laboratory in small quantities, such as less than 100 milligrams (mg) in a day. Such syntheses typically employ multiple-step reactions. In contrast, certain embodiments herein provide for the economical mass generation of Janus nanomaterials.

The Janus nanoparticles (e.g., Janus metal-oxide nanoparticles or Janus graphene nanosheets) may be produced at mass quantity through a liquid-crystal reaction medium (a lamellar phase medium or lamellar phase) having surfactant, water, and crude oil. The liquid crystal medium includes layered oil-water interfaces with intervals of a few to tens nanometers in lamellar d-spacing. This lamellar phase has multiple oil layers and multiple water layers, with an arrangement of alternating oil layer and water layer. As discussed below, each of the oil-water lamellar units may serve as an "interfacial nanoreactor" and collectively provide large interfacial-reaction areas for formation and functionalization reactions of the nanoparticles. To build the interfacial nanoreactors, embodiments employ (1) crude oil as the organic phase and (2) a petroleum surfactant for the surfactant. Crude oil is generally less expensive than relatively pure organic solvents. Petroleum surfactant may generally be defined as a surfactant viable for oil-and-gas industry applications such as EOR. Petroleum surfactant may be defined as a surfactant applicable as an EOR agent that increases hydrocarbon recovery in the EOR.

After the mass synthesis of the Janus nanoparticles, nanofluidic EOR may utilize these synthesized Janus nanoparticles. Upon formation of the Janus materials, post purification for the synthesized nanomaterial may be avoided in implementations, and the components in the reactions employed in EOR. The Janus nanoparticles and the petroleum surfactant from the lamellar phase may play synergetic roles in the subsequent EOR.

A microstructure for synthesizing Janus nanomaterial may be the liquid-crystal lamellar phase having long-range periodically structural order, formed by surfactant, water and organic solvent. The lamellar phase includes stacks of periodic molecular bilayer sheets separated by layers of solvents. By adding solvent, such as water or oil, the bilayer separation (d-spacing, lamellar periodicity) in the lyotropic lamellar phases can be swollen, for example, from less than ten nanometers to tens of nanometers. A graphic illustration of the lamellar phase is depicted in FIG. 2 and FIG. 3. The liquid-crystal lamellar phase (e.g., see FIG. 2 and FIG. 3) can include organic solvent and surfactant. Surfactant and organic solvent can be expensive. Therefore, in embodiments, the organic solvent is crude oil and the surfactant is petroleum surfactant such as petroleum sulfonate surfactant. Crude oil can be less expensive than other organic solvents for constructing the lamellar phase. Petroleum surfactant can be less expensive than other surfactants for constructing the lamellar phase. In addition, petroleum surfactants (e.g., petroleum sulfonate surfactants) may be chemical EOR agents at reservoir conditions. Thus, the petroleum surfactant in the lamellar phase may also provide the added benefit as an EOR agent when the lamellar phase is incorporated with a base fluid to form the nanofluid. From the lamellar phase, both (a) the petroleum surfactant and (b) the synthesized Janus nanomaterial (e.g., nanoparticles as in FIG. 3) may simultaneously be respective EOR agents in the nanofluid flooding. Thus, the nanofluid flooding may additionally incorporate surfactant flooding (chemical flooding) via the petroleum surfactant. Further, in some instances, the crude oil from the lamellar phase can also be a third EOR agent in the nanofluid flooding.

For the formation of the Janus nanoparticles prior to the EOR, the multiple interfaces of the lamellar phase generated by the techniques facilitate the production of the Janus nanoparticles faster and in larger quantities. Therefore, the technique is generally more suitable for industrial application than conventional "single-interface" approaches. The type of surfactant(s) chosen and employed for the "interfacial nanoreactors" may be petroleum sulfonate surfactants that can be used as EOR agents. In the EOR application of these synthesized Janus nanoparticles, the lamellar phase can be dissolved by adding water, seawater, or brine. The surfactant molecules, crude oil components, and Janus nanoparticles are dissolved or suspended in the diluted solution (flooding fluid), without post-synthesis purification or other stabilization treatment of the lamellar phase for introduction to the flooding fluid in implementations.

Figure 5:
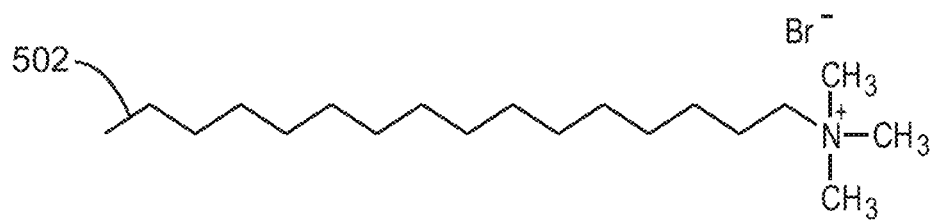
FIG. 5 is a diagram of examples of petroleum surfactants.
Figure 5:
Figure 5:
Figure 5:
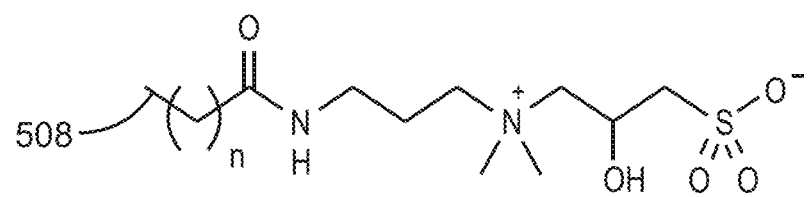
Figure 5:
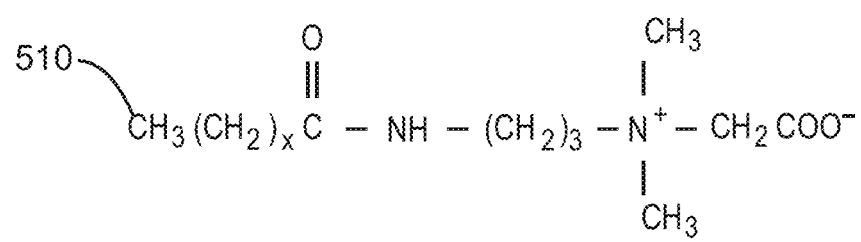

The Janus nanomaterial products collected with the lamellar-phase template components may act synergistically to provide an efficient EOR approach. The surfactants may include petroleum sulfonate surfactants which have been studied as EOR agents and proved to be stable at reservoir conditions, and are commercially available or could be extracted from certain crude oils. The petroleum surfactants to build the lamellar phase nanoreactors can be cationic, anionic, nonionic or zwitterionic types. Typical examples of their chemical structures are shown in FIG. 5.

FIG. 2 gives diagrams 200 of a bi-phase system 202 (for comparison) and a lamellar phase 204 (an implementation of present techniques). The lamellar phase 204 is a liquid-crystal system. The depicted bi-phase system 202 has a single organic-phase layer 206 and a single water-phase layer 208. In contrast, the lamellar phase 204 has multiple organic-phase layers and multiple water-phase layers. The lamellar phase 204 may be the liquid crystal phase medium such as the lyotropic liquid-crystal phase. In some implementations, the lamellar phase 204 may be generally prepared by dissolving a surfactant (with or without a cosurfactant) into water and then adding an organic solvent (e.g., mineral oil, crude oil, diesel, etc.) under agitation. The surfactant can be a cationic surfactant, anionic surfactant, nonionic surfactant, or zwitterionic surfactant. In general, surfactants may be compounds that reduce the surface tension or interfacial tension between two liquids, between a gas and a liquid, or between a liquid and a solid. The surfactant can be a petroleum surfactant. The surfactant can be a mixture of a surfactant and a cosurfactant. The cosurfactant to aid formation of the lamellar phase may be, for example, medium or long chain alcohols, such as 1-butanol, 1-pentanol, 1-hexanol, 1-heptanol, or 1-octanol, or any combinations thereof. The cosurfactant may be an alcohol having at least 4 carbons, or a number of carbons in a range of 5 carbons to 7 carbons.

An exploded view 210 of a representative section of the lamellar phase 204 is given enlarged for clarity, and which shows the lamellar phase 204 including alternating organic layers 212 and water layers 214, and the surfactant 216 as the aforementioned surfactant. The organic layers 212 may be characterized as organic phase layers. The water layers 214 may be characterized as water phase layers. The water layers 214 may be more generally aqueous layers. Further, the multiple lyotropic liquid crystals can be the surfactant molecules with the hydrophilic heads and hydrophobic tails. The surfactant 216 molecules in the exploded view 210 are depicted each with a head and a tail. In implementations, the lamellar phase 204 is generally not a micelle or emulsion. The lamellar phase 204 may typically be a planar structure with surfactant 216 hydrophilic heads contacting a water layer 214 and surfactant 216 hydrophobic tails contacting an organic layer 212 in the illustrated implementation.

The organic layers 212 as a hydrophobic layer may include organic solvent, mineral oil, refined oil, crude oil, fractions of crude oil, diesel, synthetic oil, or vegetable oil. The fractions of crude oil can include organic compounds such as decane or dodecane. The water layers 214 may be more generally an aqueous layer or hydrophilic layer. The water layers 214 may include ground water, treated water (for example, demineralized water), or formation water. The water layers 214 may include components other than water such as dissolved solids. The water layers 214 as an aqueous layer may include chemical components soluble in water.

In some instances, the organic layer 212 and water layer 214 may each be labeled as a lamellar layer. While the combination of the oil layer 212 and the water layer 214 (and with their interface) may instead be labeled as the lamellar layer, this combination is typically instead labeled as a lamellar unit 218 as depicted. The lamellar unit 214 may include the oil layer 216, the water layer 218, the oil-water interface, and the surfactant 216. Again, the surfactant 216 is the hydrophilic molecular heads and hydrophobic molecular tails. The repeating lamellar unit 218 may have a thickness, for example, in a range of 5 nanometers (nm) to 100 nm. In certain embodiments, each lamellar unit 218 may be a nanoreactor.

Embodiments employ the lamellae as template media to produce Janus nanoparticles. The lamellar phase 204 gives alternating interfaces of water and organic (e.g., oil) on the nanoscale range and, therefore, the many lamellar units 218 may each be utilized respectively as a nanoreactor for chemical reactions at the water-organic (e.g., water-oil) interfaces. The chemical reaction can be controllably-run occurring either at the water phase side of the interface or the organic phase side of the interface, or both. As discussed below, employing these nanoreactors may provide to react chemical precursors at the interface from each side of the interface (via both the water phase and organic phase) to form Janus nanoparticles at the interfaces. Also, employing these nanoreactors may provide to selectively functionalize a selected side (surface) of graphene nanosheets introduced into the lamellar phase 204, producing Janus nanosheets with one side hydrophilic and the other side hydrophobic.

In contrast to the conventional bi-phase system 202 having a single water-organic interface, the lamellar phase 204 gives many water-organic interfaces with each lamellar unit 218 being a respective lamellar nanoreactor. The lamellar phase 204 may have up to a million lamellar units 218 or more depending on the amount of surfactant and solution capacity. The repeating organic-water interfaces can amplify the interfacial area significantly by at least about a million times (for example, at about $10^6$ order) in comparison to conventional bi-phase solution techniques. The present embodiments can perform interfacial reactions to produce quantities of Janus nanoparticles for industrial application.

Figure 4:
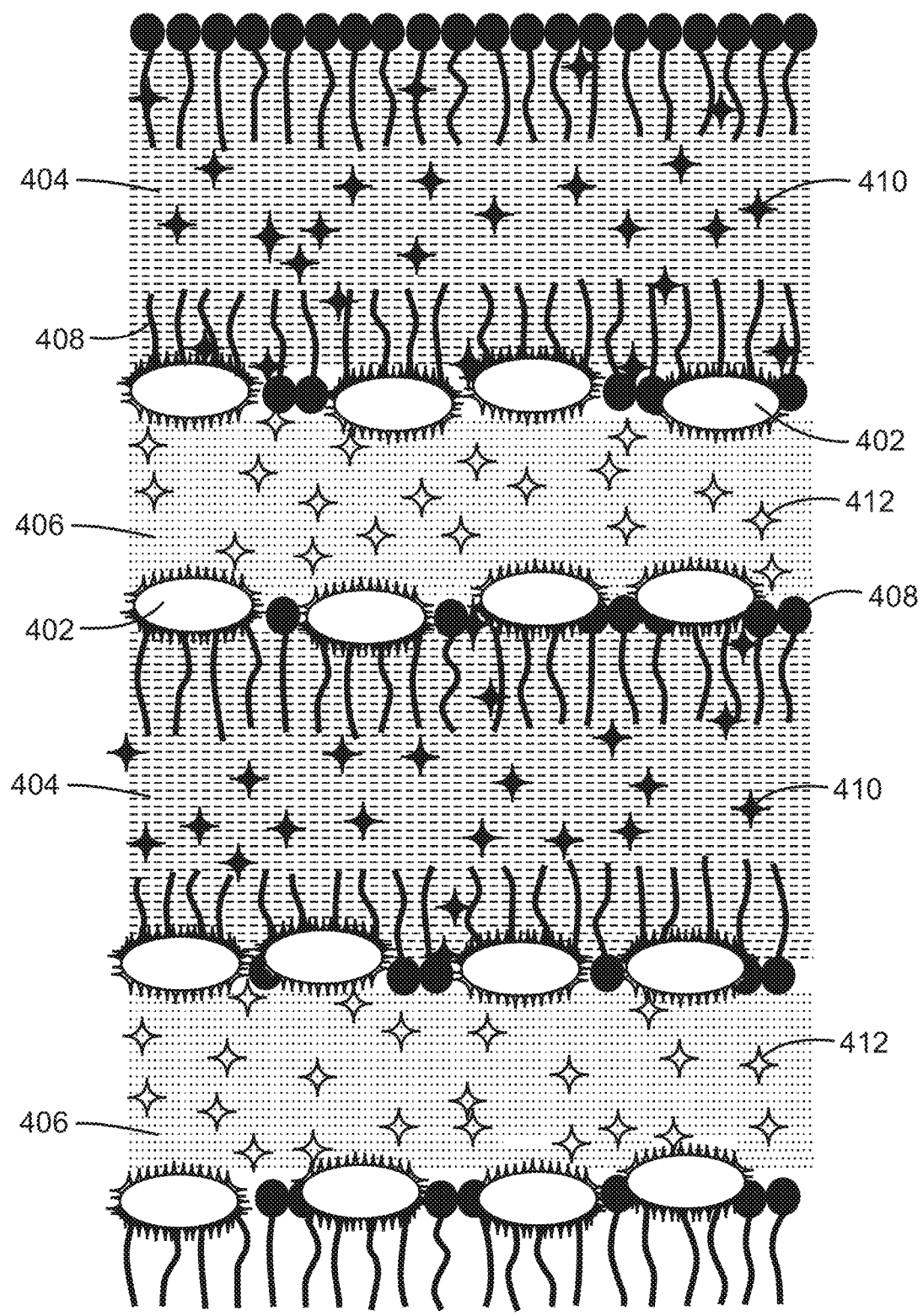
FIG. 4 is a diagram of a lamellar phase having Janus nanoparticles formed therein.

In the bi-phase system 202, typically only a small percentage, e.g., less than weight percent (wt %), of the chemical reagents introduced reaches the interface for chemical reactions. Conversely, in the lamellar phase 204, most or all of the chemical reagents introduced are generally confined in the thin layers of the solvents (organic 212 or water 214) and thus the chemical reactions at the interfaces may be more effective (for example, incorporating greater than 90 wt % of the chemical reagents). An implementation of the lamellar nanoreactor system is illustrated in FIG. 4.

FIG. 3 is a lamellar phase 300 that may be analogous to the lamellar phase 204 of FIG. 2. In certain embodiments, the organic layer 302 is crude oil. Crude oil may be less expensive than other organic solvents. The crude oil may act as an EOR agent in subsequent flooding. The surfactant 306 may include petroleum surfactant, such as petroleum sulfonate surfactant or zwitterionic petroleum surfactant. The petroleum surfactant may act as an EOR agent in the subsequent flooding.

The lamellar phase 300 has multiple organic layers 302 and multiple water layers 304. The organic layers 302 and water layers 304 are alternating. While only two organic layers 302 and one water layer 304 are depicted, the number of organic layers 302 and the number of water layers 304 in the lamellar phase 300 may each be as many as a million or more. Each organic layer 302 may be characterized as an organic phase. Each water layer 304 may be characterized as an aqueous phase. The multiple organic layers 302 collectively may be characterized as the organic phase. The multiple water layers 304 collectively may be characterized as the aqueous phase. The water layers 304 (water phase) may include ground water, treated water (for example, demineralized water), or formation water. The water layers 304 may include components other than water such as dissolved solids. The water layers 304 as an aqueous layer may include chemical components soluble in water. The organic layers 302 (organic phase) may be oil, such as mineral oil, refined oil, crude oil, fractions of crude oil, diesel, synthetic oil, or vegetable oil. The organic layers 302 may be, for example, heptane, octane, decane, dodecane, or diesel. The organic layers 302 are generally hydrophobic. As mentioned, a particular embodiment is crude oil as the organic layers 302.

The lamellar phase 300 includes surfactant 306 to facilitate formation of the lamellar phase 300. As mentioned, particular embodiments are petroleum surfactant as the surfactant 306. The surfactant 306 may be characterized as a surfactant layer. The multiple lyotropic liquid crystals of the lamellar phase 300 may be the surfactant 306 molecules each having a hydrophilic head and a hydrophobic tail in the illustrated implementation. In the illustrated embodiment, the tails of the surfactant 306 molecules extend into the organic layers 302. The heads of the surfactant 306 molecules extend into the water layers 304. The surfactant 306 resides at the interfaces between the organic layers 302 and water layers 304. A lamellar unit 208, which is d-spacing, includes an organic layer 302, a water layer 304, and the interface there between.

In some embodiments, the lamellar phase 300 may be prepared by dissolving a surfactant 306 (with or without a cosurfactant) into water and then adding an organic solvent (for example, crude oil or diesel) under agitation. The surfactant 306 can be a petroleum surfactant. The surfactant 306 can be a nonionic surfactant, a cationic surfactant, an anionic surfactant, or a zwitterionic surfactant. The surfactant 306 can be a mixture of a surfactant and a cosurfactant. The lamellar phase 300 may typically be a planar structure with surfactant 306 hydrophilic heads contacting water layers 304 and surfactant 306 hydrophobic tails contacting the organic layers 302 in the illustrated implementation. In implementations, the lamellar phase 300 is generally not a micelle or emulsion.

In some instances, the organic layer 302 and water layer 304 may each be labeled as a lamellar layer. While the combination of the organic layer 302 and the water layer 304 (and with their interface) may instead be labeled as the lamellar layer, this combination is typically instead labeled as a lamellar unit 308 (d-spacing) as depicted. The lamellar unit 308 may include an organic layer 302, a water layer 304, the organic-water interface, and the surfactant 306. The surfactant hydrophilic heads are on the water side of the interface. The surfactant 306 hydrophobic tails are on the organic side of the interface. The repeating lamellar unit 308 may have a thickness, for example, in a range of 5 nm to 100 nm. In certain embodiments, each lamellar unit 308 may be a nanoreactor. The lamellar phase 300 may have at least one million lamellar units 308. Thus, there may be at least one million nanoreactors in the lamellar phase 300. In one implementation, the lamellar phase 300 has at least 100,000 lamellar units 308, which may give a corresponding at least 100,000 nanoreactors. For the lamellar phase 300, the lamellar periodicity (d) may vary from several nanometers to several tens of nanometers by changing thickness of the organic (for example, oil) layers 302 or the water layers 304, or both. This lamellar periodicity may be measured, for example, by small-angle x-ray scattering (SAXS) measurement or small-angle neutron scattering (SANS) measurement. The thickness of the water layers 304 in the lamellar phase 100 may be, for example, in the range of 5 nm to 10 nm. The thickness of the water layers 304 may be less than 50 nm, or less than 25 nm. The thickness of the organic layers 302 in the lamellar phase 100 may be, for example, in the range of 2 nm to 15 nm. The thickness of the organic layers 302 may be less than 50 nm, less than 30 nm, or less than 25 nm.

Embodiments employ the lamellae as template media to produce Janus nanoparticles, such as Janus metal-oxide nanoparticles or Janus GO nanosheets. The lamellar phase 300 can provide alternating interfaces of water and organic layers on the nanoscale range. The many lamellar units 308 may each be utilized respectively as a nanoreactor for chemical reactions at the water-organic interfaces. The chemical reaction can be controllably-run occurring either at the water phase side or the organic phase side of the interface, or both sides of the interface. These nanoreactors may be utilized to form Janus nanoparticles (one side hydrophilic and the other side hydrophobic) via reaction of chemical precursors (chemical reagents) at the interface. These nanoreactors may be utilized to form the Janus graphene nanosheets (one side hydrophilic and the other side hydrophobic) as Janus nanoparticles via reaction of a chemical precursor with graphene nanosheets at the interface.

As discussed, because the lamellar phase 300 can generate alternative interfaces of water-organic (water-oil) on the nanoscale range, each of the lamellar units may be an interfacial nanoreactor for chemical reactions at the water-organic interfaces. Chemical precursors dissolved in the water phase or organic phase (oil phase) can access particles trapped or collected at the water-organic (water-oil) interface from the two different sides. Because the hydrophobic components of the precursors prefer to stay at the organic (oil) phase side and the hydrophilic components of the precursors prefer to stay at the water phase side of the interface, the reactions from both hydrophilic and hydrophobic components at the interfaces may result in the formation of Janus nanoparticles. A schematic illustration of the Janus nanoparticle formation in the lamellar nanoreactor system is shown in FIG. 4.

FIG. 4 is a lamellar phase 400 utilized in the formation (e.g., direct formation) of Janus nanoparticles 402. The Janus nanoparticles 402 (e.g., Janus metal-oxide nanoparticles) are formed at the organic-water interfaces (e.g., oil-water interfaces) in the lamellar phase 400. As indicated with respect to FIGS. 2 and 3, the lamellar phase 400 includes organic layers 404 (organic solvent as organic phase), water layers 406 (aqueous solvent as aqueous phase), and surfactant 408. The organic layers 404 may be crude oil. The lamellar phase 400 includes the surfactant 408 to form the lamellar phase 400. To form the Janus nanoparticles 402, chemical precursors 410, 412 as chemical reagents are added to the lamellar phase 400. The chemical precursors 410 are generally hydrophobic and may be labeled as hydrophobic precursors. The chemical precursors 412 are generally hydrophilic and may be labeled as hydrophilic precursors. In some implementations, the hydrophobic precursors 410 may be organic-soluble (or oil-soluble) organometallic compounds and the hydrophilic precursors 412 may be water-soluble organometallic compounds. Solubility may be affected by saturation conditions of the lamellar phase 400. In embodiments, at least 99 weight percent of the organic-soluble precursors 410 added may dissolve in the organic phase (layers 404) of the lamellar phase 400. At least 99 weight percent of the water-soluble precursors 412 may dissolve in the water phase (layers 406) of the lamellar phase 400.

The Janus particles 402 synthesized may be Janus metal-oxide nanoparticles, such as Janus silicon-dioxide ($SiO_2$) nanoparticles, Janus titanium-dioxide ($TiO_2$) nanoparticles, Janus zirconium-dioxide ($ZrO_2$) nanoparticles, Janus aluminum(III)-oxide ($Al_2O_3$) nanoparticles, Janus iron(III)-oxide ($Fe_2O_3$) nanoparticles, Janus zinc-oxide (ZnO) nanoparticles, Janus tin-dioxide ($SnO_2$) nanoparticles, or Janus gallium(III)-oxide ($Ga_2O_3$) nanoparticles. The Janus metal-oxide nanoparticles can be Janus rare-earth metal-oxide nanoparticles, such as Janus cerium(IV)-oxide ($CeO_2$) nanoparticles, gadolinium(III)-oxide ($Gd_2O_3$) nanoparticles, europium(III)-oxide ($Eu_2O_3$) nanoparticles, or terbium(III)-oxide ($Tb_2O_3$) nanoparticles. Janus silicon-dioxide ($SiO_2$) nanoparticles may be labeled as Janus silica nanoparticles.

In certain implementations, the chemical precursors 410 and 412 may be incorporated in an organic compound (for example, oil) and water, respectively, prior to addition to the lamellar phase 400. The chemical precursors 410, 412 may be added with the organic compound and water contemporaneous with the formation of the lamellar phase 400 or may be added after initial formation of lamellar phase 400. The chemical precursors 410, 412 migrate toward the organic-water interfaces where chemical reactions occur. A catalyst may be added to the lamellar phase 400 to accelerate the reactions. An example of a catalyst is ammonium hydroxide, tetramethylammonium hydroxide, hydrogen chloride, or acetic acid.

Janus nanoparticles 402 are formed at the organic-water interfaces via the reaction of the chemical precursors 410 with the chemical precursors 412 at the organic-water interfaces. In this implementation, the Janus nanoparticles 402 have a hydrophilic side and a hydrophobic side. The Janus nanoparticles 402 may straddle the interface. The hydrophilic side may reside in a water layer 406. The hydrophobic side may reside in an oil layer 404. The Janus nanoparticles 402 directly formed may be Janus metal-oxide nanoparticles, as discussed.

In the syntheses of Janus nanoparticles 402, such as Janus $SiO_2$ nanoparticles, Janus $TiO_2$ nanoparticles, or Janus $ZrO_2$ nanoparticles, the hydrophilic precursors 412 may include water-soluble organometallic compounds. Examples include tetraalkyl orthosilicate (alkyl is methyl or ethyl), tetraalkyl orthotitanate (alkyl is ethyl, propyl, isopropyl, butyl, or tert-butyl), and tetrapropyl zirconate (alkyl isethyl, propyl, isopropyl, butyl, or tert-butyl). These organometallic compounds can react with water to form metal oxide nanoparticles in aqueous phase (water layers 406) with or without a catalyst, as depicted in equations [1], [2], and [3]:

$$Si(OC_nH_{2n+1})_4 + H_2O \rightarrow SiO_2 + C_nH_{2n+1}OH, (n=1,2,3,4) \quad [1]$$

$$Ti(OC_nH_{2n+1})_4 + H_2O \rightarrow TiO_2 + C_nH_{2n+1}OH, (n=1,2,3,4) \quad [2]$$

$$Zr(OC_nH_{2n+1})_4 + H_2O \rightarrow ZrO_2 + C_nH_{2n+1}OH, (n=1,2,3,4) \quad [3]$$

In the syntheses of Janus metal-oxide nanoparticles 402 (for example, Janus $SiO_2$ nanoparticles, Janus $TiO_2$ nanoparticles, or Janus $ZrO_2$ nanoparticles), examples of the hydrophobic precursors 410 may include oil-soluble organometallic compounds, such as n-alkyltriethoxysilane (alkyl is hexyl, octyl, decyl, dodecyl, tetradecyl, hexadecyl, or octadecyl), perfluoroalkyl-1H,1H,2H,2H-triethoxysilane (alkyl is hexyl, decyl, or octylphenyl), aminoalkyltriethoxysilane (alkyl=undecyl or octadecyl), and phenylalkyltrimethoxysilane, (alkyl is ethyl, propyl, or butyl). These organometallic compounds can reach an organic-water interface and hydrolyze with water to form a thin layer on the metal-oxide nanoparticles while hydrophobic tails of these precursors 410 remain in the organic-phase side (in the organic layer 404) at the organic-water interface. Synergetic effects of the reaction on the water side (water layer 406) of the interface with the reaction on the organic side (organic layer 404) of the interface can result in formation of metal-oxide nanoparticles 402 with Janus structure.

As described, embodiments synthesize Janus metal-oxide nanoparticles at mass quantity through one-pot reactions in a liquid-crystal lamellar phase. The liquid-crystal lamellar-phase medium may consist of surfactant, water, and organic compound(s) (for example, crude oil) to generate layered organic-water interfaces. The organic-water interfaces may be generated at intervals, for example, of about 10 nm. Each organic-water interface (interfacial unit) can serve as an interfacial nanoreactor that provides interfacial reaction area for the reactions that form the Janus nanoparticles. In implementations, chemical precursors are mixed in an organic phase solution or an aqueous phase solution. Then, the two solutions are mixed at controlled surfactant-water-organic ratios to form the liquid-crystal lamellar phase. Chemical reactions may occur upon mixing the precursors from the two phases. When the reactions are complete or near completion, Janus nanoparticles with one side hydrophilic and another side hydrophobic may be formed. Some embodiments are the direct formation of Janus nanoparticles without need for a post-synthesis surface functionalization. The direct formation may produce the Janus nanoparticles in quantities for industrial application.

The lamellar phase 200, 300, 400 of the preceding figures may be similarly utilized to directly form Janus GO nanosheets as Janus nanoparticles. The Janus GO nanosheets may be formed by incorporating GO nanosheets (hydrophilic) in the water layers and a chemical precursor(s) that is a hydrophobic functional agent into the organic layers. The hydrophilic GO nanosheets and the hydrophobic functional agent (chemical reagent) meet at the interfaces between organic layers and water layers and react to form the Janus GO nanosheets at the interfaces. In particular, the hydrophobic functional agent grafts onto the surface of the GO nanosheets from the organic layer side via the surface —OH groups of the GO nanosheets turning that side of the GO nanosheet from hydrophilic to hydrophobic to give the Janus structure.

FIG. 5 is examples of petroleum surfactants 500 that may be utilized to build the lamellar phase. The depicted example indicates typical types and chemical structures of the petroleum surfactants that may be utilized in synthesis of Janus nanoparticles. These types of surfactants to construct liquid-crystal lamellar phase for mass synthesis of Janus nanoparticles (e.g., metal-oxide nanoparticles and GO nanosheets). The petroleum surfactants 500 may be utilized as the surfactant 216, 306, 408 of the preceding figures. The petroleum surfactants 500 may utilized as the surfactant in the lamellar phase 120 of FIG. 1. The petroleum surfactants 500 may be petroleum sulfonate surfactants that have been demonstrated as applicable as EOR agents and to be stable at reservoir conditions, and are commercially available or could be extracted from certain crude oils. The petroleum surfactants to build the lamellar phase nanoreactors (and subsequently used in the EOR) can be in cationic, anionic, nonionic or zwitterionic types, and typical examples of their chemical structures are depicted in FIG. 5

An example of a cationic petroleum surfactant is cetyltrimethylammonium bromide (CTAB) 502. The cationic petroleum surfactant may be CTAB or cetyltrimethylammonium chloride (CTAC), or their analogues, with different length of hydrocarbon chain. The phase behavior of CTAB gives this amine-based cationic surfactant as applicable for the EOR process in carbonate reservoirs. Moreover, CTAB perform well in combination with Janus silica nanoparticles in the EOR. The relationship between temperature and interface tension (IFT) is that increasing the temperature results in decreasing IFT.

An example of an anionic surfactant is sodium dodecyl sulfate (SDS) 504. SDS 504 is a petroleum surfactant applicable to EOR and that belongs to the alkyl sulfate group. This surfactant is a good partner for nanoparticles when injected as part of an EOR process. IFT is reduced by nanoparticles enhancing the surface activity of anionic surfactant below the surfactant critical-micelle concentration. The cloud point of this surfactant is greater than 100° C.

With respect to the surfactants, the term "nonionic" may mean not ionic, not anionic, and not cationic. A nonionic surfactant may have covalently bonded oxygen-containing hydrophilic groups, which are bonded to hydrophobic parent structures.

An example of a non-ionic petroleum surfactant is polyoxyethylene(4) lauryl ether (Brij® 30) 506, which is in the family of poly (ethylene/propylene) alkyl ethers that nonionic surfactants made from ethylene oxide or propylene oxide. This non-ionic surfactant family may generally be surface active agents to increase the capillary displacement efficiency of an aqueous flooding medium. They are also thermally stable because of high cloud points and the hydrophilic structure makes them stable even at high salinity environments as well, which has been relied on to increase surfactant solubility under high salinity conditions to overcome the salting out effect. Application in a carbonate reservoir at temperatures up to 100° C. and salinity up to 200,000 parts per million (ppm) resulted in good oil recovery and wettability alteration was detected as the main mechanism for oil recovery.

Figure 11A:
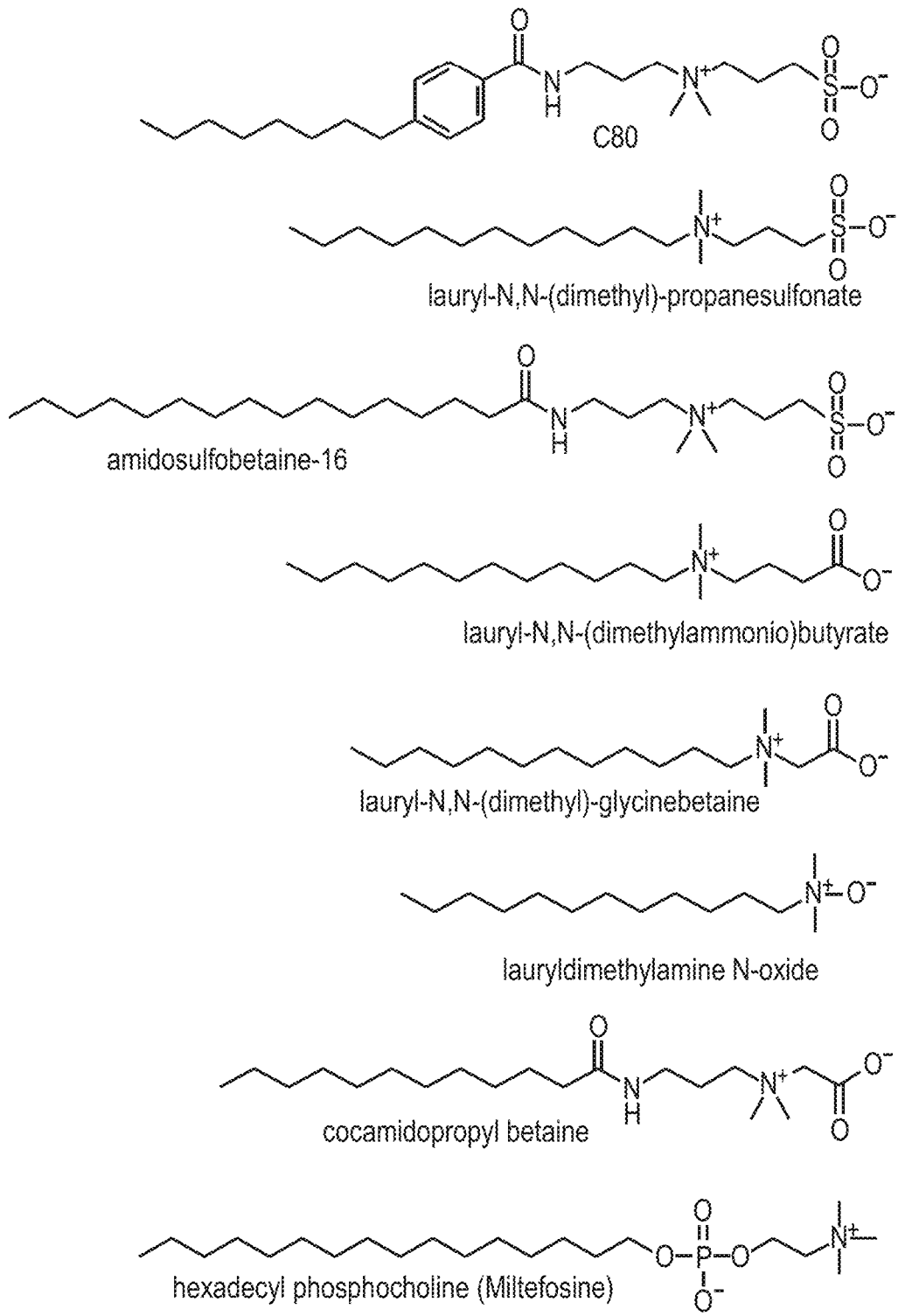
FIGS. 11A and 11B are diagrams of examples of zwitterionic surfactants that may be employed as the petroleum surfactant.
Figure 11B:
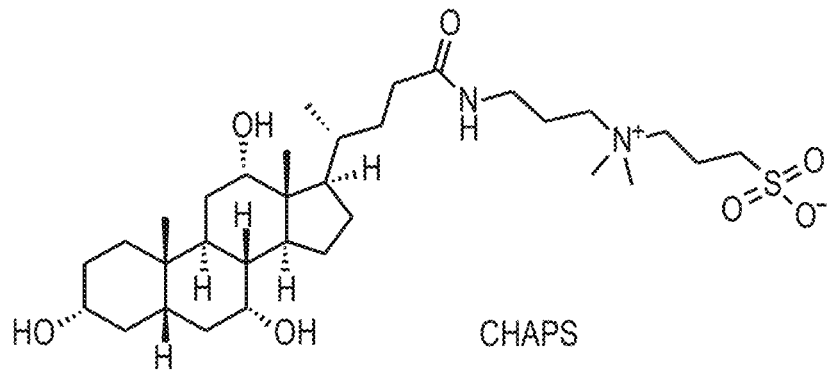
Figure 11B:
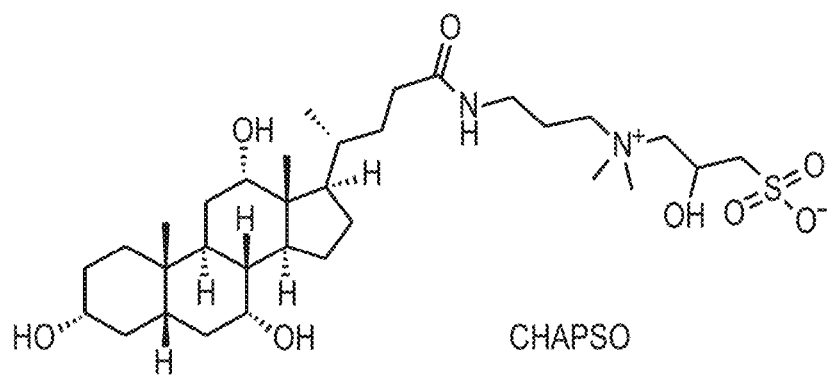
Figure 11B:
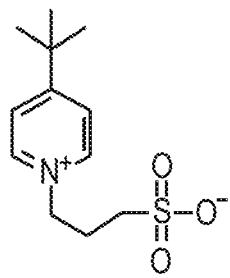
Figure 11B:
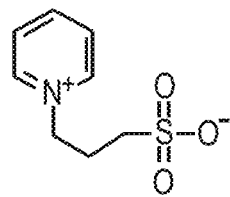

An example of a zwitterionic petroleum surfactant is cocamidopropyl hydroxysultaine (CANS) 508, where n=6, 8, 10, 12, 12, 16. An example of a zwitterionic petroleum surfactant is cocamidopropyl betaine (CAPB) 510, where x=10-12. FIG. 11A and FIG. 11B are examples of zwitterionic surfactants that may be employed as the petroleum surfactant.

Figure 6:
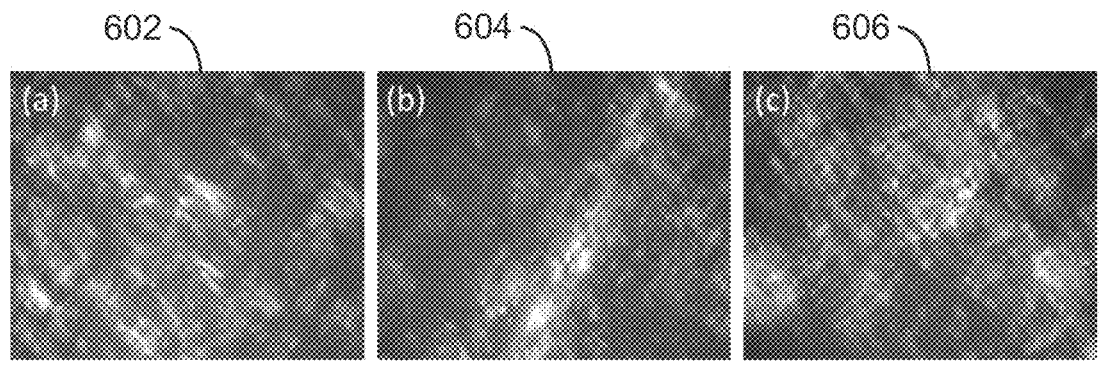
FIG. 6 is three images depicting birefringent patterns.

Zwitterionic surfactants are amphiphilic organic compounds that hold hydrophobic groups in their molecular tail and hydrophilic groups in their molecular head. Zwitterionic surfactants have been widely used as foam booster, humectant, antistatic agent and viscosity builder, and are applicable in bubble baths, hair conditioners, cream rinses, shampoos, hand soaps, cleansing creams and lotions, shower gels, and baby products. The present disclosure recognizes that strong electrolyte tolerance, temperature resistance and thermal stability, better wetting and foaming performance make zwitterionic surfactants applicable as an oil recovery enhancer. Water solution of some zwitterionic surfactants can reduce the interfacial tension between crude oil and water to ultra-low value as $5.4 \times 10^{-3}$ millinewton per meter (mN/m) at low concentration of 0.010 gram per liter (g/L). Zwitterionic surfactants, such as CAHS 508 (Petrostep® SB), CAPB 510 (Amphosol® CG-50, Amphosol® LB), etc., can form liquid-crystal lamellar phases at certain concentrations including with assistance of a co-surfactant. A liquid-crystal lamellar phase can be form with petroleum zwitterionic surfactant, water and crude oil. As shown in FIG. 6, typical birefringent patterns from liquid-crystal lamellar phases with zwitterionic surfactants are observed by polarized microscopy.

FIG. 6 are three images 600 depicting birefringent patterns observed under polarized microscopy of liquid crystal lamellar phases formed with zwitterionic surfactants. Image 602, 604, and 606 depict birefringent patterns observed under polarized microscopy of liquid crystal lamellar phases formed with zwitterionic surfactants (a) Petrostep SB, (b) Amphosol CG-50, and (c) Amphosol LB, respectively.

Example

A typical synthesis for Janus $SiO_2$ nanoparticles in the laboratory per implementations of the present techniques was performed by first dissolving hydrophilic precursor surfactants (CAHS and hexanol) and tetraethoxysilane (TEOS) in water and dissolving the hydrophobic precursor octodecyltriethoxysilane (OTES) in crude oil. Then, the two solutions were mixed with a vertex mixer to form the uniform lamellar phase. Subsequently, a small amount of ammonium hydroxide as catalyst was introduced to the system to accelerate the reaction. Although the ammonium hydroxide can diffuse quickly within the lamellar phase, the solution was mixed by a vertex mixer for about 1 minute. The typical recipe of the lamellar phase is: 40 wt % zwitterionic surfactant (CAHS in this typical synthesis) in water, 1:1 molar ratio of the zwitterionic surfactant to cosurfactant (hexanol), and 2:1 volume ratio of water to crude oil. Other zwitterionic surfactants (e.g., CAPB) and cosurfactants may be employed. The experiment was performed at room temperature. The cosurfactant (hexanol) further promotes formation of the lamellar phase. The formation of the lyotropic liquid-crystal lamellar phase was confirmed by SASX and birefringence measurements.

The synergetic effects of the reactions from both the water and oil sides resulted in the formation of Janus nanoparticles within the lamellar interfacial nanoreactors. Upon the completion of chemical reactions at room temperate for 12 hours without stirring, the formed Janus nanoparticles were collected by centrifuge and purified by washing with ethanol, acetone, and water for further characterization, although the purification may be avoided in commercially implementation for EOR application. For characterization purpose, aminoundecyltriethoxysilane instead of OTES was also used as hydrophobic compounds to functionalize the Janus nanoparticles.

Figure 7:
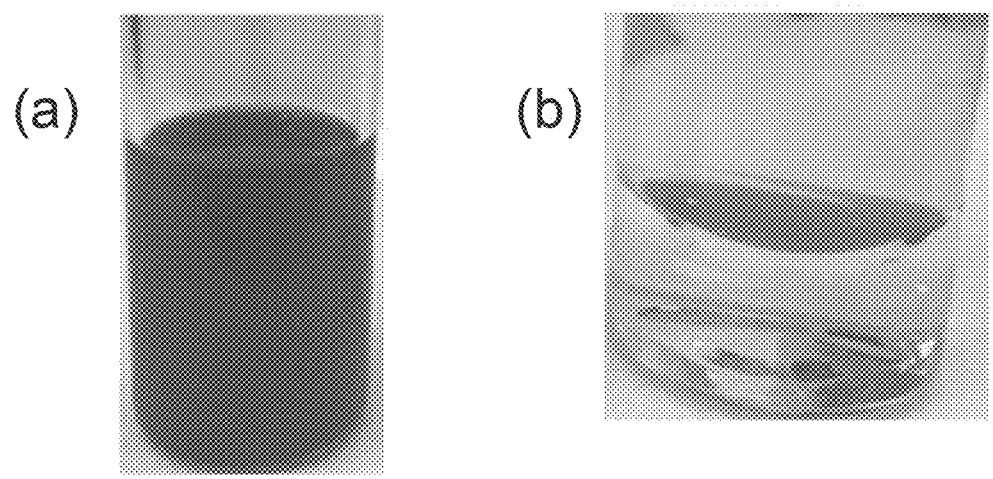
FIG. 7 is a photo depicting Janus nanoparticles as formed, and also depicting the Janus $SiO_2$ dispersed in water/hexane mixture.

FIG. 7 is a photo with respect to the Example. In particular, the photo depicts: (a) a vial with the synthesized Janus $SiO_2$ nanoparticles as formed in the surfactants-water-crude oil lamellar phase; and (b) a beaker having Janus $SiO_2$ nanoparticles separated and then dispersed in water/hexane mixture. The asymmetric surface property of the Janus nanoparticles, i.e. one hydrophilic side and another hydrophobic side, makes Janus nanoparticles tend to be assembled at the water/oil interface. Because of the hydrophobic property in a half side of the Janus nanoparticles, Janus nanoparticles also adsorbs crude oil on that half surface of the nanoparticle and thus exhibits a layer of brown color from the crude oil. The adsorbed crude oil can be removed by exhausting washing with organic solvent such as chloroform or hexane.

Figure 8:
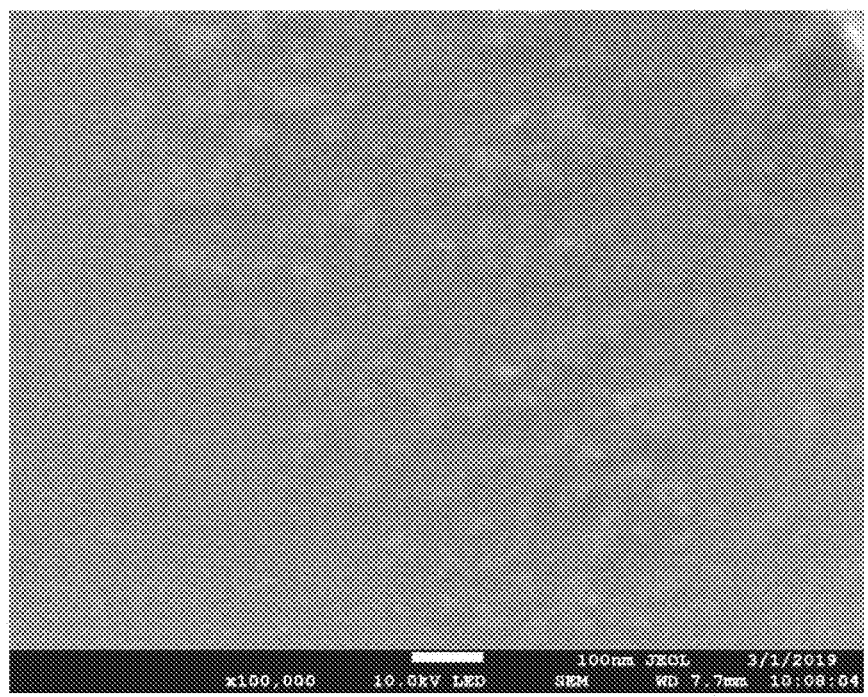
FIG. 8 is a scanning electron microscope (SEM) image of Janus nanoparticles.

FIG. 8 is a scanning electron microscope (SEM) image of the Janus $SiO_2$ nanoparticles synthesized in the Example in lamellar template media. The Janus $SiO_2$ nanoparticles may be characterized via the SEM image. The SEM image indicates morphology of the synthesized Janus $SiO_2$ nanoparticles. The SEM image shows that sizes of the nanoparticles are in nanometer scale.

Figure 9:
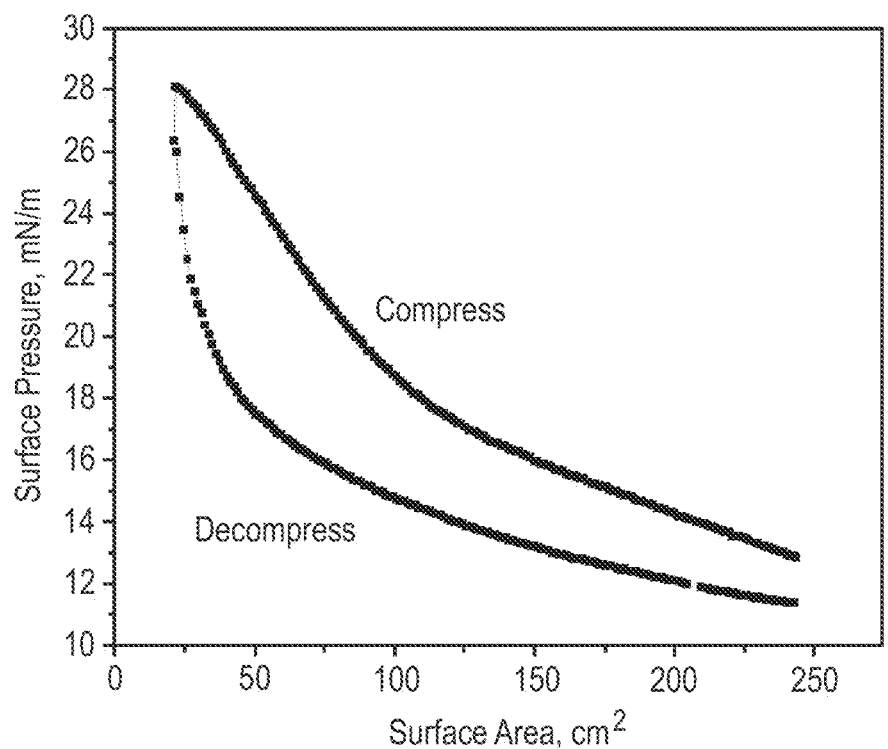
FIG. 9 is a plot of surface pressure over surface area of Janus nanoparticles.

To confirm the Janus property, Langmuir-Blodgett technology was utilized to measure interfacial pressure of Janus nanoparticles at the water-oil interface. When injecting the Janus $SiO_2$ nanoparticles suspension into water/hexane mixture, a nanoparticle monolayer forms at the water/hexane interface. Applying lateral pressure to compress nanoparticle monolayer, the surface pressure (Tr) can reach approximately 28 mN/m, as indicated in FIG. 9. This implies that the Janus nanoparticles did not enter either the water or the organic phase under surface pressure, confirming the formation of stable Janus structure. FIG. 9 is a plot of surface pressure (nM/m) over surface area in square centimeters (cm 2) of the Janus nanoparticles (formed in the Example) at water-hexane interface in a Langmuir-Blodgett trough. Two curves (compress and decompress) of the measured data are plotted to give surface pressure-area curves of Janus $SiO_2$ nanoparticles. The surface pressure can reach at least about 20 dyne per centimeter. The particle layer formed on water also can be transferred onto a solid substrate, and the SEM can confirm the monolayer of nanoparticles.

Figure 10:
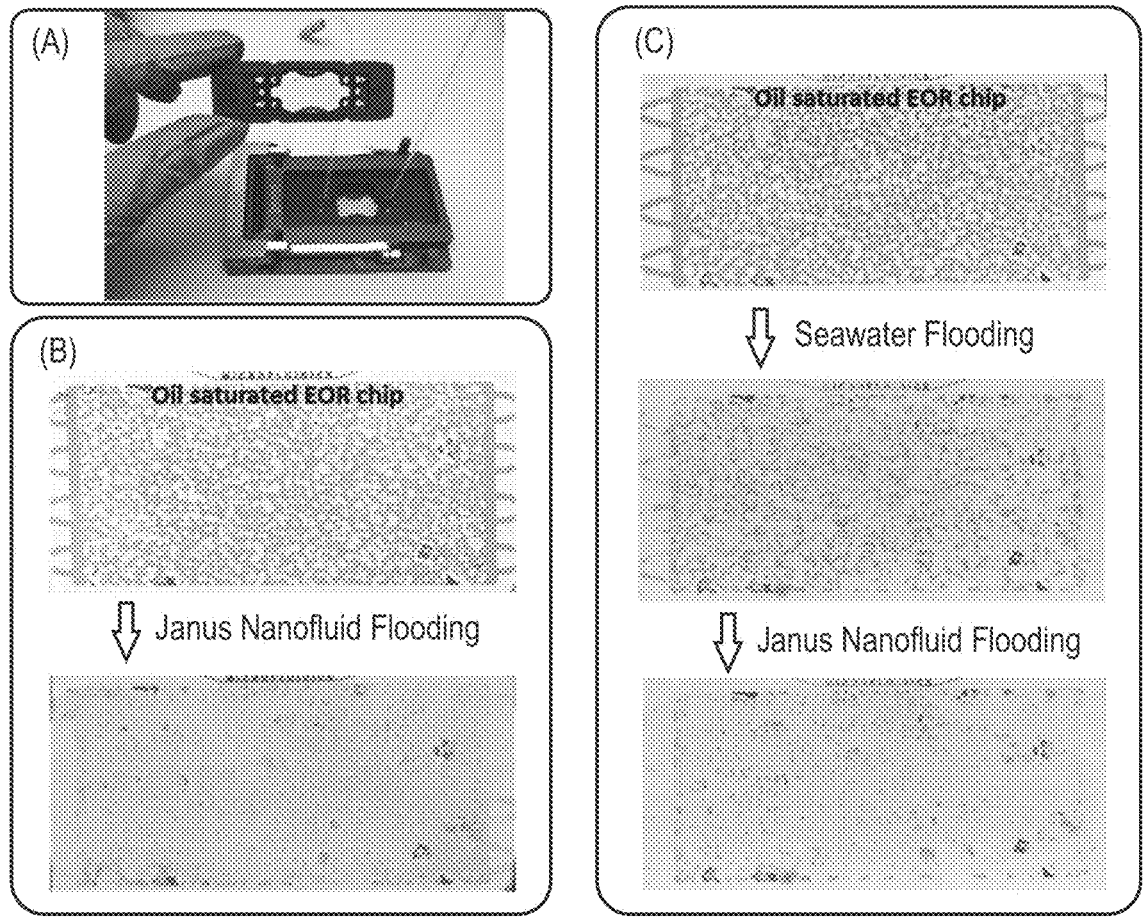
FIG. 10 gives images depicting evaluation of effects of simulated enhanced oil recovery.

FIG. 10 gives images depicting evaluation of EOR effects. The images are photographs of (A) a microfluidic EOR chip and the chip holder, (B) crude oil saturated chip before and after a nanofluid flooding with as-synthesized Janus $SiO_2$ nanoparticles, 0.1 wt % dispersed in seawater, and (C) crude oil saturated chip flooded by seawater and then followed by purified Janus $SiO_2$ nanoparticles, 0.1 wt % dispersed in seawater. In (B), dispersed in the seawater was 0.5 wt % zwitterionic surfactant (that was used to compose the lamellar phase having the as-synthesized Janus $SiO_2$ nanoparticles).

The EOR chip is made of quartz and the brown color is oil phase in the images. To evaluate the EOR effects of the Janus nanoparticles $SiO_2$ synthesized in the Example, oil replacement experiments were performed in microfluidic chips. The EOR microfluidic chips are built by borosilicate glass (from Micronit) with reservoir rock structure as shown in (A) of FIG. 8. In the nanofluidic flooding experiments, the chips were first saturated by crude oil and aged at 100° C. for 3 days, and then the oil replacement was performed by injecting seawater or 0.1 wt % Janus nanoparticles in seawater suspension. Since the surfactants used to construct the lamellar nanoreactors for nanoparticles synthesis can also be used as EOR agents, the as-synthesized Janus nanoparticles are used together with lamellar phase (reaction media) for the EOR test without separation or purification. The nanofluid flooding experiment revealed that the Janus nanoparticles and the surfactants play synergetic role for the oil replacement as indicated in (B) of FIG. 8. Comparing the seawater flooding experiments with and without Janus nanoparticles, the observation is that the Janus nanoparticles can further improve the EOR efficiency, as demonstrated in (C) of FIG. 8.

In summary, the EOR efficiency was determined by fluorescence analysis in microfluidic chips. A crude oil saturated chip was first flooded by seawater, and then flooded by the zwitterionic surfactant-Janus nanoparticles. The ratios of crude oil to seawater with or without EOR agents in the microfluidic chip were calculated as the EOR efficiency. The combination of the zwitterionic surfactant and Janus nanoparticles exhibits better EOR performance than using the surfactant or Janus nanoparticles only.

In conclusion, nanofluid flooding experiments in microfluidic system demonstrate that the Janus nanoparticles can be used as EOR agents to increase oil recovery. The Janus nanoparticles can be synthesized in large quantity in liquid crystal lamellar phase media. Relatively inexpensive petroleum surfactants, crude oils and water may be employed to construct the lamellar phases, and with the synthesis to scale to industrial applications. The synthesized Janus nanoparticles have beneficial interfacial properties at water-oil interfaces. There may be a synergy in the EOR flooding with the combination of the Janus nanoparticle flooding and the zwitterionic surfactant flooding. Core-flooding experiments can be utilized to evaluate the EOR effects. Core-flooding tests can recognize the factor of enhancement. Core-flooding data can address the enhancement factor.

Lastly, as discussed, a particular microstructure for certain embodiments is the organic lyotropic liquid-crystal with periodically structural order. This microstructure may be labeled as the lamellar (La) phase or smectic A mesophase and formed in solvents (for example, water and organic compounds) with a surfactant or mixtures of surfactant and cosurfactant. The surfactant may be nonionic, anionic, cationic, or zwitterionic. The lamellar phase may consist of stacks of periodic molecular bilayer-sheets separated by layers of solvents. By adding solvents, such as water and an organic compound (for example, oil), the bilayer separation (for example, d-spacing or d, lamellar periodicity) in the lyotropic lamellar phases can be increased from a nanometer to tens of nanometer. The larger of the d-spacing, generally the better for the chemical reaction for nanoparticle formation. A stable phase can be at a d-spacing at least 15 nm or at least 20 nm for the synthesis of Janus nanoparticles.

A liquid crystalline mesophase may be called lyotropic if formed by dissolving an amphiphilic mesogen in a solvent under specified conditions of concentration, temperature, and pressure. In contrast to thermotropic liquid crystals, lyotropics liquid crystals have an additional degree of freedom in the concentration that enables them to induce a variety of different phases. As the concentration of amphiphilic molecules is increased, several different type of lyotropic liquid crystal structures occur in solution, and the lamellar phase may be formed. This lamellar phase is denoted by the symbol Lα and can be considered the lyotropic equivalent of a smectic A mesophase. The lamellar phase may consist of amphiphilic molecules arranged in bilayer sheets separated by layers of water. A mesophase may be a state of matter intermediate between liquid and solid. Gelatin is a common example of a partially ordered structure in a mesophase.

An embodiment is a method of EOR. The method includes combining a lamellar phase (having Janus nanoparticles, a petroleum surfactant, crude oil, and water) with additional water (e.g., fresh water, seawater, brine, etc.) to give a flooding fluid. The petroleum surfactant (e.g., less than 1 wt % of the flooding fluid) from the lamellar phase may be petroleum sulfonate surfactant, zwitterionic surfactant, CAHS, CAPB, etc. The Janus nanoparticles may be Janus metal-oxide (e.g., $SiO_2$) nanoparticles or Janus graphene-oxide nanosheets, or a combination thereof. In implementations, the Janus nanoparticles are less than 0.2 wt % of the flooding fluid. The method includes pumping, via a centrifugal pump, the flooding fluid through a wellbore into a subterranean formation. The wellbore may have casing, and wherein pumping the flooding fluid involves pumping the flooding fluid through perforations in the casing into the subterranean formation. The EOR may involve nanofluid flooding via the Janus nanoparticles and surfactant flooding via the petroleum surfactant. The method includes affecting a property of hydrocarbon (e.g., crude oil) in the subterranean formation via contact of the flooding fluid with the hydrocarbon. For instance, the property may be viscosity, and wherein affecting the viscosity includes reducing the viscosity. The property may be IFT between crude oil and water in the subterranean formation, and wherein affecting the IFT includes reducing the IFT, such as to $5.4 \times 10^{-3}$ mN/m or less. The Janus nanoparticles may adsorb onto crude oil-water interfaces in the subterranean formation. The method may include producing the hydrocarbon and the flooding fluid from the subterranean formation through another wellbore to the Earth surface. The method may include preparing the lamellar phase, wherein preparing the lamellar phase involves forming in a vessel the lamellar phase having water layers, crude oil layers, and the petroleum surfactant, and reacting chemical precursors in the lamellar phase in the vessel to form the Janus nanoparticles at interfaces of the water layers with the crude oil layers.

Another embodiment is a method of synthesizing Janus nanoparticles for EOR. The method includes forming in a vessel a lamellar phase having water layers, crude oil layers, and a zwitterionic petroleum surfactant (e.g., CAHS, CAPB, etc.). The method includes reacting chemical reagents in the lamellar phase in the vessel to form Janus nanoparticles at interfaces of the water layers with the crude oil layers. The reacting of the chemical reagents to form the lamellar phase in the vessel may involve incorporating a first chemical reagent (e.g., hydrophilic) in the water layers, incorporating a second chemical reagent (e.g., hydrophobic) in the crude oil layers, and allowing the first chemical reagent to react with the second chemical reagent at the interfaces to form the Janus nanoparticles (e.g., Janus $SiO_2$ nanoparticles) at the interfaces. The method includes collecting the lamellar phase from the vessel for distribution to an EOR application comprising nanofluid flooding via the Janus nanoparticles and surfactant flooding via the zwitterionic petroleum surfactant. In implementations, the collecting of the lamellar phase does not include separating the Janus nanoparticles from the lamellar phase. The nanofluid flooding via the Janus nanoparticles to reduce IFT at crude oil-water interfaces in a subterranean formation, and wherein the Janus nanoparticles may adsorb onto crude oil-water interfaces in the subterranean formation.

Yet another embodiment is a method of EOR. The method includes forming in a reactor vessel a lamellar phase having water layers, crude oil layers, and a petroleum surfactant. The petroleum surfactant may be petroleum sulfonate surfactant, zwitterionic surfactant, CAHS, CAPB, etc. The method includes reacting chemical reagents in the lamellar phase in the reactor vessel to form Janus nanoparticles (e.g., Janus metal-oxide nanoparticles, Janus graphene oxide nanosheets, etc.) at interfaces of the water layers with the crude oil layers. The method includes mixing additional water with the lamellar phase to give a flooding fluid as at least a nanofluid. The method includes providing the flooding fluid via a pump through a wellbore into a subterranean formation, and flooding the subterranean formation as EOR, wherein the flooding comprises nanofluid flooding via the Janus nanoparticles. The flooding may involve surfactant flooding via the petroleum surfactant.

Yet another embodiment is flooding fluid for EOR including a lamellar phase collected from a reactor vessel, the lamellar phase having a petroleum surfactant, crude oil, water, and Janus nanoparticles. As discussed, the petroleum surfactant may be, for example, petroleum sulfonate surfactant, zwitterionic surfactant, CAHS, CAPB, and the like. As also discussed, the Janus nanoparticles may be, for example, Janus metal-oxide nanoparticles or Janus GO nanosheets, or a combination thereof. The flooding fluid additionally includes an aqueous fluid that may be water, brine, or seawater, or any combinations thereof. The flooding fluid is a nanofluid based on the Janus nanoparticles, and wherein the flooding fluid to affect a property of hydrocarbon in a subterranean formation via contact of the flooding fluid with the hydrocarbon.

A number of implementations have been described. Nevertheless, it will be understood that various modifications may be made without departing from the spirit and scope of the disclosure.

What is claimed is:

1. A method of synthesizing Janus nanoparticles for enhanced oil recovery (EOR), comprising:
    forming in a vessel a lamellar phase comprising water layers, crude oil layers, and a zwitterionic petroleum surfactant;
    reacting chemical reagents in the lamellar phase in the vessel to form Janus nanoparticles at interfaces of the water layers with the crude oil layers; and
    collecting the lamellar phase from the vessel for distribution to an EOR application comprising nanofluid flooding via the Janus nanoparticles and surfactant flooding via the zwitterionic petroleum surfactant.

2. The method of claim 1, wherein reacting the chemical reagents comprises:
    incorporating a hydrophilic chemical reagent in the water layers;
    incorporating a hydrophobic chemical reagent in the crude oil layers; and
    allowing the first chemical reagent to react with the second chemical reagent at the interfaces to form the Janus nanoparticles at the interfaces.

3. The method of claim 1, wherein the Janus nanoparticles comprise Janus silicon dioxide ($SiO_2$) nanoparticles.

4. The method of claim 1, wherein the zwitterionic petroleum surfactant comprises cocamidopropyl hydroxysultaine (CANS) or cocamidopropyl betaine (CAPB), or a combination thereof.

5. The method of claim 1, wherein collecting the lamellar phase does not comprise separating the Janus nanoparticles from the lamellar phase, wherein nanofluid flooding via the Janus nanoparticles to reduce interfacial tension (IFT) at crude oil-water interfaces in a subterranean formation, and wherein the Janus nanoparticles to adsorb onto crude oil-water interfaces in the subterranean formation.

6. A method of enhanced oil recovery (EOR), comprising:
    forming in a reactor vessel a lamellar phase comprising water layers, crude oil layers, and a petroleum surfactant;
    reacting chemical reagents in the lamellar phase in the reactor vessel to form Janus nanoparticles at interfaces of the water layers with the crude oil layers;
    mixing water with the lamellar phase to give a flooding fluid comprising nanofluid;
    providing the flooding fluid via a pump through a wellbore into a subterranean formation; and
    flooding the subterranean formation as EOR, wherein the flooding comprises nanofluid flooding via the Janus nanoparticles.

7. The method of claim 6, wherein the petroleum surfactant comprises a zwitterionic petroleum surfactant.

8. The method of claim 7, wherein the zwitterionic petroleum surfactant comprises cocamidopropyl hydroxysultaine (CANS) or cocamidopropyl betaine (CAPB), or a combination thereof.

9. The method of claim 6, wherein the flooding comprises surfactant flooding via the petroleum surfactant.

10. The method of claim 6, wherein the Janus nanoparticles comprises Janus metal-oxide nanoparticles.

11. The method of claim 6, wherein the Janus nanoparticles comprises Janus graphene oxide nanosheets.

* * * * *